United States Patent
Dufourd et al.

(10) Patent No.: US 9,166,861 B2
(45) Date of Patent: Oct. 20, 2015

(54) METHOD FOR MANAGING COMMUNICATION CHANNELS, CORRESPONDING SIGNAL AND TERMINAL

(75) Inventors: Jean-Claude Dufourd, Le Kremlin Bicetre (FR); Elouan Le Coq, Rennes (FR); Nicolas Pierre, Marpire (FR)

(73) Assignee: Streamezzo, Rennes (FR)

( * ) Notice: Subject to any disclaimer, the term of this patent is extended or adjusted under 35 U.S.C. 154(b) by 729 days.

(21) Appl. No.: 12/444,540

(22) PCT Filed: Sep. 27, 2007

(86) PCT No.: PCT/EP2007/060272
§ 371 (c)(1),
(2), (4) Date: Jun. 30, 2009

(87) PCT Pub. No.: WO2008/040677
PCT Pub. Date: Apr. 10, 2008

(65) Prior Publication Data
US 2010/0029313 A1    Feb. 4, 2010

(30) Foreign Application Priority Data

Oct. 6, 2006 (FR) .................. 06 08822
Nov. 27, 2006 (FR) .................. 06 10362

(51) Int. Cl.
| | | |
|---|---|---|
| H04B 7/00 | (2006.01) | |
| H04B 1/18 | (2006.01) | |
| H04L 29/06 | (2006.01) | |
| H04L 29/08 | (2006.01) | |

(52) U.S. Cl.
CPC ...... *H04L 29/06027* (2013.01); *H04L 65/4076* (2013.01); *H04L 65/80* (2013.01); *H04L 67/04* (2013.01); *H04L 67/14* (2013.01)

(58) Field of Classification Search
None
See application file for complete search history.

(56) References Cited

U.S. PATENT DOCUMENTS

| | | | | |
|---|---|---|---|---|
| 6,516,191 | B1 * | 2/2003 | Greenspan et al. | 455/412.1 |
| 6,882,639 | B1 | 4/2005 | Balabanian | |
| 7,844,491 | B1 * | 11/2010 | Haitsuka et al. | 705/14.4 |
| 2005/0069225 | A1 | 3/2005 | Schneider et al. | |
| 2005/0123001 | A1 * | 6/2005 | Craven et al. | 370/486 |
| 2008/0046937 | A1 * | 2/2008 | Smith et al. | 725/89 |
| 2008/0279215 | A9 * | 11/2008 | Wendling et al. | 370/465 |

OTHER PUBLICATIONS

International Search Report of Counterpart Application No. PCT/EP2007/060272 filed on Sep. 27, 2007.
French Search Report of Foreign Counterpart Application No. FR/06 10362 filed on Nov. 27, 2006.
Examination Report from European Application No. 07 820 660.4, dated Mar. 24, 2010.
Written Opinion from International Application No. PCT/EP2007/060272, dated Jan. 15, 2008.

* cited by examiner

*Primary Examiner* — Fanghwa Wang
(74) *Attorney, Agent, or Firm* — Zilka-Kotab, PC

(57) ABSTRACT

A method is provided for managing communication channels for transmission of multimedia contents from at least one server to at least one radio communication terminal. The method includes: transmitting a first content through a first channel; progressively rendering the first content in a terminal; issuing via the terminal a request for a second content, the request including a control datum indicating whether the second content is to be transmitted through the first channel or through a second channel; and progressively rendering the second content.

10 Claims, 2 Drawing Sheets

METHOD FOR MANAGING COMMUNICATION CHANNELS, CORRESPONDING SIGNAL AND TERMINAL

CROSS-REFERENCE TO RELATED APPLICATIONS

This Application is a Section 371 National Stage Application of International Application No. PCT/EP2007/060272, filed Sep. 27, 2007 and published as WO 2008/040677 on Apr. 10, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the rendering of multimedia content on a radio communication terminal, such as for example a mobile telephone, Personal Digital Assistant (or PDA), portable computer, etc.

To be more precise, the disclosure is based on the transmission of a multimedia content, a portion of said content, and/or elements representative thereof, to a radio communication terminal, via one or more transmission channels.

Multimedia content is taken to mean a unit consisting of at least one animated graphical scene, otherwise known as a multimedia scene, and a set of commands for changing said scene from one state to another. A multimedia scene equates in particular to the arrangement of a set of graphical objects in time and space, with which the user of the radio communication terminal is able to interact.

Multimedia service is also taken to mean a content sequence that maintains for the user an impression of continuity, whether said continuity is obtained by successive updates of the same multimedia scene or by juxtaposition of successive multimedia scene.

The disclosure can be employed in all fields that require a representation of signals in the form of a spatio-temporal arrangement of graphical objects, with interactivity.

In particular, the disclosure applies to already known graphical scene description formats such as MPEG-4/BIFS (Binary Format Scene), SVG (Scalable Vector Graphics), SMIL (Synchronized Multimedia Integration Language), XHTML (eXtensible Hyper Text Markup Language), etc.

For example, the disclosure can be employed when using graphical scene description formats such as those previously cited on HTTP (Hyper Text Transport Protocol), TCP/IP (Transmission Control Protocol/Internet Protocol) or RTP (Real Time Protocol) transmission channels, and more generally on the types of transmission channel used inter alia by DVB (Digital Video Broadcast), DMB (Digital Multimedia Broadcast), 3GPP (Third Generation Partnership Project), and OMA (Open Mobile Alliance) standards, etc.

BACKGROUND OF THE DISCLOSURE

Techniques for transmitting a multimedia content to a radio communication terminal are already known.

Conventionally, according to a first transmission technique, a service is designed, in other words an item of information is offered to a radio communication terminal user, by implementing the following sequence:
an initial content is sent to the terminal;
the user consumes it as the content is being sent, and makes a request;
a response content is then sent to the radio communication terminal, while the first content send is still active.
There is then a choice on the terminal:
either the first content must be stopped and the second content (response content) is then able to use the same transmission channel as the first content;
or the first content must continue to be received and played in parallel with the second content.

The service is therefore designed as a succession of contents sent to the user terminal in response to interactive requests on a certain number of transmission channels. Known techniques do not allow a decision to be made, at the time the response content is received, as to whether to cut the first communication (first content transmission) and re-use said channel, or to open a new independent communication channel for the response content.

For example, if the user requests a music download service, the initial content sent to the terminal includes a first music stream.

The user consumes it, in other words, listens to the music stream, and makes a request to obtain information about the music.

A new response content, comprising the requested information, is then sent to the radio communication terminal.

According to a first possible behavior, the channel transmitting the first content is always cut when a second content is received, which guarantees that the terminal only uses one communication channel (otherwise termed transmission channel) at one and the same time. However, one drawback with this behavior is that it does not allow the use of mixed network cooperation services with one part thereof being transmitted through one communication channel, and another part being simultaneously transmitted through another communication channel, this second channel being able to be of a type that is different from the first one. Consequently, this behavior is particularly suited to very constrained terminals which do not allow more than one communication channel to be open at the same time.

According to a second possible behavior, the first communication channel is still kept open when the second content is received, which allows services to be employed that use network cooperation, with one part thereof being transmitted through one communication channel, and another part being simultaneously transmitted through another communication channel, this second channel being able to be of a type that is different from the first one. However, this behavior has major drawbacks:
it does not allow one or more services to be operated on very constrained terminals which do not allow more than one communication channel to be open at the same time;
it does not allow the communication to be cut when the second content is received, thereby compelling the terminal to consume the rest of the first content. Because of this, even if the server has stopped sending data in respect of said first content, the network transmission buffers are full and several seconds of content will still be received and therefore needlessly consume resources on the terminal. The first content server may also be different from the second content server, and therefore not be informed of the request, and consequently continue sending until the initially planned end of the first content.

According to a third possible behavior, reception of the first content is cut as soon as the request for a second content is issued, thereby guaranteeing that the terminal uses only one communication channel at the same time. However, one drawback with this behavior is that it does not allow the implementation of mixed network cooperation services with one part thereof being transmitted through one communication channel, and another part being simultaneously transmitted through another communication channel, this second channel being able to be of a type that is different from the first one. Consequently, this behavior is particularly suited to very constrained terminals which do not allow more than one communication channel to be open at the same time.

SUMMARY

An aspect of the disclosure relates to a method for managing communication channels for the transmission of multimedia content from at least one server to at least one radio communication terminal.

According to an embodiment of the invention, said method comprises the following steps:
  transmitting a first content through a first channel;
  progressively rendering (or consuming) said first content in a terminal;
  issuing via said terminal a request for a second content, said request comprising a control datum indicating whether said second content is to be transmitted through said first channel or on a second channel;
  progressively rendering said second content.

An embodiment of the invention thus allows the progressive rendering of a first content (for example in "streaming" mode) transmitted via a first communication channel, and the rendering of a second content following a request from the terminal, transmitted via the first communication channel or via a second channel.

In particular, these different contents may be transmitted by different servers, but destined for one and the same terminal. It is also important to note that the different communication channels employed may be of different types (for example a two-way telephone channel and a one-way broadcast channel).

Thus, a request for a second content comprises a control datum indicating whether the second content is to be transmitted through the first channel, or through a second channel, as a function of content type for example. Then, in response to this request, the second content may be transmitted through the channel communicating the first content, thereby interrupting the transmission of the first content, or through another communication channel.

For example, in the context of highly constrained terminals, the first communication channel can be re-used in order to transmit the second content, thereby preventing these terminals from having to open a second communication channel which would be of poor quality.

According to a particular embodiment of the invention, the progressive rendering of the first content continues so long as no response is received to the request.

A service author is thus able to design his service so as to help a terminal user pass the time while waiting for a response to a request, by continuing to show on the terminal the content which is in the process of being consumed.

According to a particular aspect of an embodiment of the invention, if the control datum provides for the use of a second channel, the first and second contents are rendered progressively at least partially in a simultaneous way.

The second content may thus be displayed in a multimedia scene associated with the first content.

In particular, this multimedia scene may have been changed (by means of scene change commands) so as to improve the perception of the second content: for example, the sound volume associated with the first content is reduced when the second content is rendered.

According to another aspect of an embodiment of the invention if the control datum provides for the use of the first channel only, the second content is rendered progressively in replacement of the first content.

Moreover, according to one alternative, the terminal issues a request for the interruption of the transmission of the first content destined for the corresponding server, in other words destined for the server supplying the first content to the terminal.

According to a particular embodiment of the invention, the control datum is an attribute of an element of a multimedia scene carrying a link to the server transmitting said second content.

A new attribute is thus specified, denoted for example 1sr:ConnectionPipe, so that indication is possible as to whether the second content is to be transmitted through the first channel, or through a second channel.

It will be noted that in the HTML (Hyper Text Markup Language) standard, an element α may also have a new attribute of the "target" type. However, it is important to note that this "target" attribute, only specifies aspects relative to rendering. To be more precise, this attribute specifies the space in which the response to the request is to be displayed, in other words the place in the multimedia scene where the second content is going to be rendered, but does not specify the content distribution conditions, and particularly which communication channel may be used.

Likewise, XLink parameters, as specified in the LASeR and SAF formats, also specify aspects relative to rendering. To be more precise, these parameters specify the way in which a second content related to a first content received in response to a request separate from that for the first content (main content) should be consumed.

Again, it is important to note that none of these parameters relates to the distribution mode or management of the communication channels used, as is proposed by the invention in accordance with at least one embodiment.

In particular, according to a particular embodiment of the invention, said attribute may assume one of the at least three following values:
  new channel;
  current channel;
  pre-set channel identifier.

For example, the attribute may assume the value "new" in order to specify a new channel, or the "current" value in order to specify the current channel, or else use the communication channel name (for example "Channel X") in order to identify a pre-set channel.

According to one particular inventive feature, the management method implements a step whereby the terminal issues a request for the explicit closure of an open communication channel, by referring to it by its identifier.

Using the XML format, this closure request, otherwise known as "directive", can be denoted <ClosePipe name="channel X"/>

Another aspect of the invention relates to a signal for managing the communication channel in order to implement the previously described communication channel management method. To be more precise, such a signal sent by a radio communication terminal, comprises a control datum field indicating whether a second content is to be transmitted through the first channel, or through a second communication channel.

In particular, the control information field may assume one of the following values:
new channel;
current channel;
preset channel identifier.

Moreover such a signal may comprise a request for the explicit closure of an open communication channel by referring to it by its identifier.

Yet another aspect of the invention relates to a radio communication terminal intended to receive at least one multimedia content broadcast by at least one server.

Such a terminal comprises means for:
progressively rendering a first content transmitted through a first channel;
issuing a request for a second content, said request comprising a control datum indicating whether said second content is to be transmitted through said first channel, or on a second channel;
progressively rendering said second content.

Such a terminal is in particular suited to the implementation of the previously described communication channel management method.

In particular, such a terminal comprises specific means allowing each step in the communication channel management method to be implemented independently.

Finally, another embodiment of the invention relates to one or more computer program products that can be downloaded from at least one communication network and/or recorded on a medium that can be read by a computer and/or run by a processor, comprising program code instructions for implementing at least some steps in the previously described transmission channel management method.

BRIEF DESCRIPTION OF THE DRAWINGS

Other characteristics and advantages will become clearer from reading the following description of a particular embodiment, given as a simple illustrative and non-restrictive example, and the appended drawings, among which.

DETAILED DESCRIPTION OF ILLUSTRATIVE EMBODIMENTS

1. Description of One Inventive Embodiment

Figure 1A:
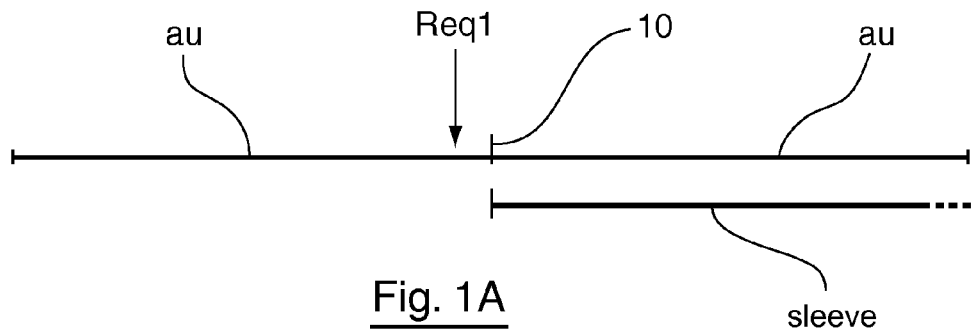
FIGS. 1A and 1B show respectively the rendering of a first content in parallel with the rendering of a second content through two communication channels, and the rendering of a second content following the interruption of the rendering of a first content through one and the same communication channel.

The general principle of an embodiment of the invention is based on the transmission from a server to a terminal of a first content through a first communication channel, and on the progressive rendering (consumption) of this first content, with a possibility of interaction with the terminal user. To be more precise, a particular embodiment of the invention provides for the transmission to a server of a control datum, when a request is issued by a terminal for a second content to be transmitted, indicating whether this second content is to be transmitted through the first channel, or through a second transmission channel. When the response to the request is received, the terminal may determine whether the reception of the first content is to be interrupted and whether the second content is to re-use the same transmission channel as the first content, or whether the reception and consumption of the first content is to be continued in parallel with the reception and consumption of the response to the request transmitted on another transmission channel.

An embodiment of the invention thus proposes a completely new and inventive approach to the transmission of a multimedia content to a radio communication terminal based on managing the communication channels used when successively sending responses to requests in one and same service.

To be more precise, according to a particular embodiment, the invention proposes indicating, in a new content sent in response to a request, the information for managing whether or not to re-use a communication channel that is already in use.

In particular, this new content transmission signal may contain a datum as to whether the channel used by the content previously sent and still being consumed (first content) must or must not be cut. Moreover, said signal may contain a datum as to whether the new content (second content) sent in response to a request is to re-use the channel already in use for the content previously sent and still being consumed (in other words re-use the first communication channel). Furthermore said signal may contain an identifier for the communication channel to be used for the new content sent in response to the request.

Indeed, the use of one and/or other of the communication channels is deemed to be dependent on the type of service required when a request is made and must therefore ensue from the intentions of the content author. Consequently, the "behavior" of the communication channels is changed depending on the situation encountered.

Hitherto, reasons related to content type and to the service situation did not allow a decision to be made, at the time the request was made, as to whether or not to cut the reception of the first content. According to an embodiment of the invention, if the content is a music stream for example, it is conceivable for the author to want the user to be able to carry on listening to this music during the time spent waiting for the request to be transmitted to the server, for the server to react and for the response to the request to be returned.

Figure 3:
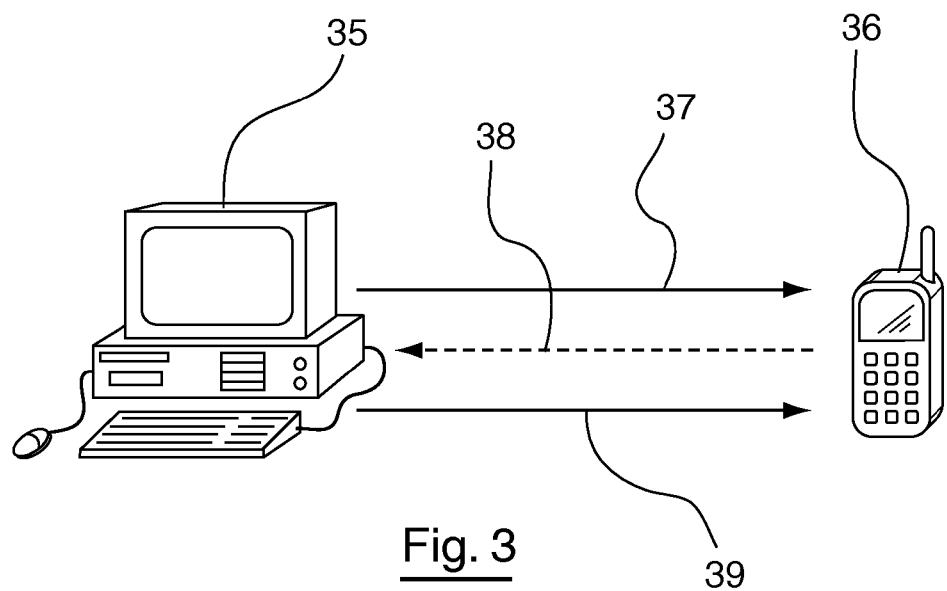
FIG. 3 shows the general principle of an embodiment of the invention, according to which a first content, and then a second content are transmitted to a radio communication terminal, subsequent to a request from the terminal.
Figure 4:
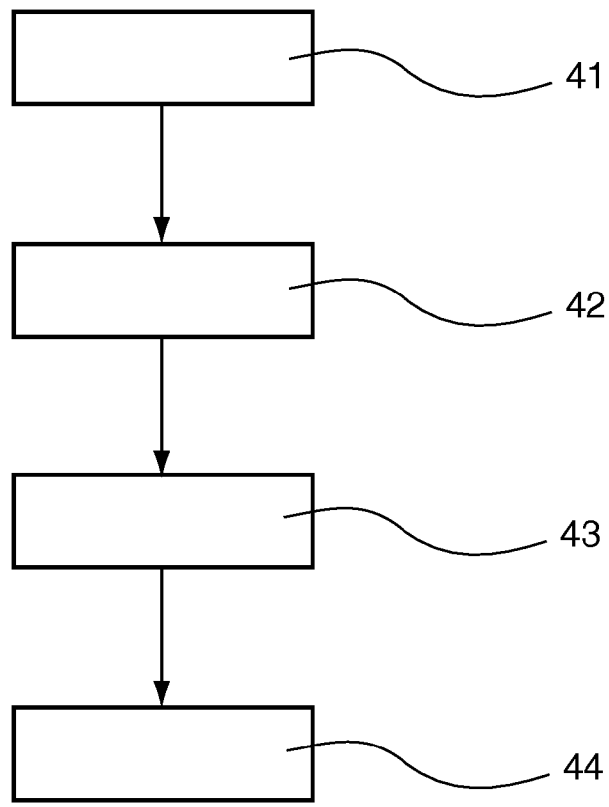
FIG. 4 shows the different steps implemented in accordance with one particular embodiment of the invention.

Thus in relation to FIGS. 3 and 4 an example has been shown of the implementation of an embodiment of the invention.

To do this a single server 35 is considered, providing a service to a radio communication terminal 36. It is clear that an embodiment of the invention also applies to the situation where information is transmitted from a plurality of servers to at least one radio communication terminal.

In this example, the server 35 is deemed to transmit during a first step 41 a first content 37 to the communication terminal 36.

During a step 42, the first content 37 (or at least a part of said content) is rendered progressively on the terminal 36. In other words, a transmission in "streaming" mode is used.

If the user of the terminal 36 wishes to receive a second content, he issues a request 38 to the server 35 during a step 43, asking the server 35 to send him the second content.

According to a particular embodiment of the invention, the request 38 also comprises a control datum indicating whether the second content is to be transmitted through the first channel, or through a second channel.

According to this particular embodiment, so long as no response is received to the request 38, the terminal 36 continues to render the first content during step 43.

According to another approach, it is possible to interrupt the rendering of the first content immediately after the request is issued or after a preset length of time.

Lastly, during a step 44, the second content 39 is transmitted (through the first or through a second communication channel) and rendered on the terminal.

Hereinafter a description is given in relation to the figure of a particular embodiment of the invention based (non-exclusively but simply by way of illustration) of the use of a Lightweight Applications Scene Representation (LASeR) and Simple Aggregation Format (SAF) environment.

Let's consider a service in LASeR format for downloading music tracks. It will be remembered that a service is a sequence of contents, maintaining for the user an impression of continuity, a content being a unit consisting of a least one animated graphical scene, otherwise known as a multimedia scene, and a set of commands allowing said scene to be changed from one state to another. For example, said continuity may be obtained by successive updates of the same multimedia scene, the service then being designed in such a way that the user does not see any page changing, and all the responses to user requests being partial updates of the current scene. In this event, there is no replacement of one scene by another. It should be noted that, conventionally, replacement is the preferred time for recovering all resources, and in particular any open communication channel.

In this embodiment example, the service starts with successive screens for choosing a first music track. The user is deemed to have chosen a track. During a local interaction (choice of track), a request is built and then sent to the server. The server responds in the form of a scene update comprising an audio element with its control elements accompanied by a music stream. This music stream is played, by the terminal, on reception. The user is deemed to further interact with the service. Some interactions are purely local and do not give rise to requests to the server. For interactions giving rise to a dialogue with the server, two types of situation must be distinguished:
a first situation type where the response to the request does not challenge the consumption of the music stream;
a second situation type where the response to the request assumes that the consumption of the music stream stops.

In the first situation type, the request is for example a request for additional information about the music stream, such as for example a request for the CD sleeve to be displayed, or a request to purchase the physical album. In this event, the music stream is transmitted on a first communication channel. The response to the request is transmitted on a second communication channel, and then decoded and returned to the scene which is rendering the music stream. For example, this response is rendered in the form of information displayed in a temporary window superimposed over the graphical elements related to the stream consumption control, previously called the control elements.

In the second situation type, the request is, for example, a request for a second music stream. In this event it is necessary to stop consuming the first stream before starting to consume the second stream. In particular, the second stream server may be different from the first stream server. Consequently it is not certain that the first stream server is aware of the request for a second stream, and therefore continues transmitting the first stream. It is therefore up to the terminal to cut the communication of the first stream, either to inform the server that consumption has stopped and/or to avoid having to eliminate first stream packets contained in the different network buffer zones. Indeed, these buffer zones often equate to several seconds of content, between 2 and 10 seconds depending on the situations, which is costly in terms of resources.

It is therefore important to be able, at the time each response is received to:
either continue consuming a stream in progress and use a new communication channel for the response;
or stop consuming a stream in progress and re-use one and the same communication channel to consume the response.

According to this embodiment of the invention, this decision may be made through the use of a control datum contained in the scene data, for example in the commands for changing the scene from one state to another.

For example, the request is assumed to be transmitted by activating an element α of the scene, for example a graphical object of the scene. Such an element comprises several attributes, as specified in the LASeR and SAF formats. For example, the element α is activated by invoking a URL contained in the attribute xlink::href of said element α.

According to this embodiment, a new attribute 1sr:connectionPipe added to the element α is specified. This attribute is deemed to be able to assume the values:
"new" specifying a new communication channel,
"current" specifying the current communication channel (generally the first communication channel) or
a preset channel identifier, for example in the form of the communication channel name.

Using a communication channel name "X" is equivalent to giving the value "new" to the attribute 1sr:connectionPipe, and also allows the channel to be cut subsequently by an explicit command, for example <ClosePipename=<"X"/> in XML format.

To pick up again on the aforementioned first situation, according to which the response to the request does not challenge the consumption of the music stream, the attribute 1sr:connectionPipe must have the value "new" or the name of a second communication channel different from the name of the first communication channel being used for the music stream. If this first communication channel being used for the music stream has no name, then the attribute 1sr:connectionPipe may have the value "new" or the name of any communication channel.

Likewise, to pick up again on the aforementioned second situation, according to which the response to the request stops the consumption of the music stream, the attribute 1sr:connectionPipe must have the value "current" or the name of the first communication channel, being used for the music stream. If this first communication channel being used for the music stream has no name, then the attribute 1sr:connectionPipe must have the value "current".

Hereinafter a description is given of an example of an algorithm used to implement an embodiment of the invention, illustrated using scene fragments. It will be understood that in a service situation in LASeR format, the bit equivalent of these scene fragments would be transmitted.

Appendix 1, which forms an integral part of the description shows a fragment for the scene comprising the "au" music stream in course of consumption and comprising two possible requests, a request req1 for the sleeve to be displayed, corresponding to the first situation and a request req2 for a second stream to be transmitted, corresponding to the second situation.

For example, FIG. 1A shows the first situation, in accordance with which the "au" music stream is transmitted through a first communication channel and the request does not challenge the consumption of the "au" stream. When the response to the request req1 is received 10, the terminal will not cut the reception of the "au" music stream, and the sleeve "poch" display information will be transmitted through a second communication channel.

Figure 1B:
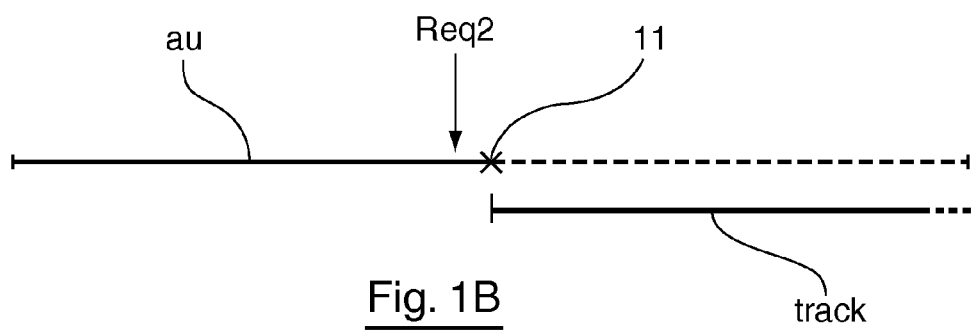

FIG. 1B shows the second situation, in accordance with which the "au" music stream is transmitted through a first communication channel and the request challenges the consumption of the "au" stream. When the response the request req2 is received 11, the terminal will cut said reception. Consequently, the "au" music stream is no longer transmitted through the first communication channel and a second stream denoted "track" is transmitted on this first channel. According to an alternative, this second stream denoted "track" may be transmitted through a second communication channel.

Figure 2:
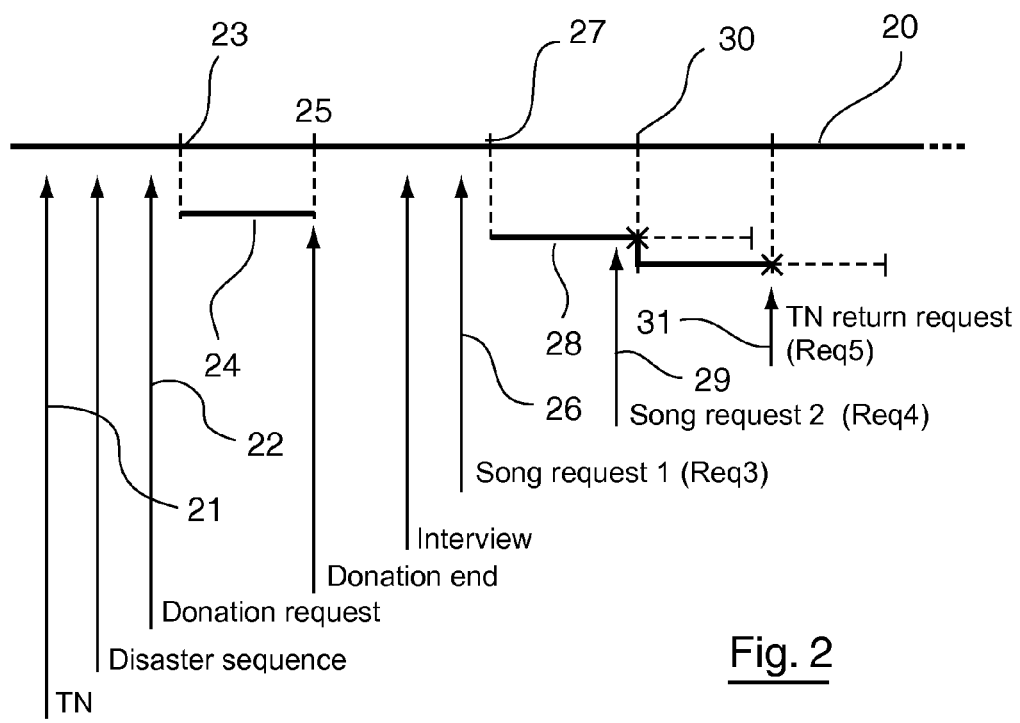
FIG. 2 shows an example of the opening and closure of a second communication channel according to a particular embodiment of the invention.

A description is now given in relation to FIG. 2 of another example of the use of an embodiment of the invention described in the context of a service whereof the main part is broadcast forward, in other words in "broadcast" mode, for example in a DVB-H environment. Improvements to this service may be required interactively on a backward channel, for example with a GSM, GPRS or UMTS mobile telephone connection.

The main characteristic of a service of this kind is that the terminal stays connected throughout the duration of a transmission on the DVB-H Channel, so as to continue receiving the stream of basic information from the service. For example, the user is in the process of viewing a television news broadcast. The number 21 is used to denote the start of the television news, transmitted through the DVB-H Channel 20.

During this news broadcast, additional information is regularly offered in the form of a scrolling streamer in which the interactive fields (clickable fields) give access to additional contents. Here are two examples of additional contents:

during an interview with a popular female vocalist, otherwise known as a "interview" scene, a proposal is made to listen to her last three hits;

during a topic on a natural disaster, otherwise known as a "disaster" scene, an online donation to a charitable organization is suggested.

During the "disaster" scene, a clickable field appears. The user clicks to request the donation form. This donation form is telephone operator specific, and therefore sent on a telephone channel. An object of the "disaster" scene corresponding to the element α configured as follows is activated:

<αid="req" lsr:connectionPipe="new"
    xlink:href="http://*.org/serv?gift"/>

When activating this clickable field a request req22 is sent to a server. When the response 23 is received, the DVB-H Channel 20 is maintained and a telephone channel (of the UMTS type for example) 24 is created to manage the donation form. At the end of the operation, the information transmission is terminated and the transmission channel 24 used to receive the donation form is closed naturally 25 by the server.

During the "interview" scene, a clickable field appears. The user clicks to ask to listen to the first track ("song request 1" (req3) 26). For external reasons, the three tracks cannot be part of the data related to the television news transmission but must be received by a telephone channel. An object of the "interview" scene corresponding to the element α configured as follows is activated:

<αid="req3" lsr:connectionPipe="song"
    xlink:href="http://*.org/serv?song=1"/>

When this clickable field is activated, the request 26 for the first song is sent. When the response 27 is received, the DVB-H Channel is maintained, even if the sound volume of the television news is temporarily reduced to 0. Another UMTS communication channel 28, denoted "song" is open, and the song starts to be played. The user continues to see the news broadcast, with the clickable fields, while he is listening to the song. He then wishes to move on to the second song and activates another clickable field. An object of the "interview" scene corresponding to an element α configured as follows is activated:

<a id="req4" lsr:connectionPipe="song"
    xlink:href="http://*.org/serv?song=2"/>

When this second clickable field is activated, the request 29 (req4) for the second song is sent. In this example, the first song continues to be played. When the second response 30 is received, the connection to the "song" channel is cut so that the channel can be re-used for the second song. The content of the buffers of the first song is destroyed. The second song begins to be played through the "song" channel. The user then wishes to return to the television news and transmits a TN return request (req5) 31. An object corresponding to a conditional element configured as follows is activated:

<lsr:conditional id="req5">
    <lsr:ClosePipe name="song"/>
    ... other commands related to the return to TN...
    ... including return to the normal TN sound volume...
</lsr:conditional>

Following this operation, the "song" transmission channel 28 used for the two songs is closed and only the consumption of the stream DVB-H 20 continues.

2. Appendix 1

<saf:SAFSession ...>
    <saf:sceneHeader .../>
    ... (image streams used by the scene) ...
    <saf:mediaHeader streamID="au" ...audio stream header... />
    <saf:sceneUnit ...>
        <lsr:NewScene>
            ...
            <audio xlink:href="stream:au".../>
            ...
            <a id="req1" lsr:connectionPipe="new"
                xlink:href="http://*.org/serv?poch=6553"/>
            ...
            <a id="req2" lsr:connectionPipe="current"
                xlink:href="http://*.org/serv?track=7554"/>
            ...
        </lsr:NewScene>
    </saf:sceneUnit>
    ... ad lib audio packets ...

3. Conclusion

At least one aspect of the disclosure relates a technique for re-using an already open communication channel to receive a previous content when a new content is received.

At least one embodiment uses such a technique that can be employed in particular on very constrained terminals that do not allow more than one communication channel to be used at the same time, for services which can be run on such terminals.

At least one embodiment uses a technique that is cost-effective in terms of resources, guaranteeing that the terminal uses only one communication channel at the same time, for services which can be run in these conditions.

At least one embodiment uses a technique for managing the number of communication channels used at each moment by the terminal.

At least one embodiment uses a technique for the re-use, in order to receive a new content or a new content portion, of a particular channel among the communication channels already open.

At least one embodiment uses such a technique for implementing services that use network cooperation and with one part thereof being transmitted through one communication channel, and another part being simultaneously transmitted through another communication channel, this second channel being of a type that may be different from the first one.

In particular, an exemplary embodiment provides such a technique offering better performance in terms of service fluidity at the radio communication terminal.

Although the present disclosure has been described with reference to one or more examples, workers skilled in the art will recognize that changes may be made in form and detail without departing from the scope of the disclosure and/or the appended claims.

The invention claimed is:

1. A method, comprising:
    receiving a multimedia scene including first content at a terminal over a current channel;
    presenting the multimedia scene at the terminal, wherein presenting the multimedia scene includes presenting the first content and a plurality of fields within the multimedia scene;
    during the presentation of the multimedia scene, receiving a selection of one of the plurality of fields within the multimedia scene, wherein the selected field is associated with a second content;
    in response to the selection of the field, identifying an attribute of the field, wherein the identified attribute identifies a channel for receiving the second content associated with the selected field;
    managing the channel for receiving the second content associated with the selected field utilizing the identified attribute by:
    identifying whether the attribute of the field identifies one of a first value, a second value, and a third value,
    when the attribute identifies the first value, determining that the second content will utilize a named channel,
    when the attribute identifies the second value, determining that the second content will utilize the current channel, and
    when the attribute identifies the third value, determining that the second content will utilize a new channel;
    in response to a determination that the second content will utilize the named channel:
    identifying an open connection already utilizing the named channel,
    closing the open connection that is already utilizing the named channel, and
    opening a new connection utilizing the named channel for receiving the second content utilizing the named channel, such that when the named channel is also the current channel utilized for receiving the first content, then the receipt of the first content is stopped;
    in response to a determination that the second content will utilize the current channel:
    closing an open connection that is already utilizing the current channel to receive the first content,
    opening a new connection utilizing the current channel for receiving the second content utilizing the current channel, and
    rendering progressively the second content in replacement of the first content; and
    in response to a determination that the second content will utilize the new channel, opening a new connection utilizing the new channel for receiving the second content of the multimedia scene utilizing the new channel while continuing to receive the first content at the terminal over the current channel.

2. The method of claim 1, wherein when the attribute identifies the second value and it is determined that the second content will utilize the current channel, the second content is rendered progressively in replacement of the first content.

3. The method of claim 1, wherein closing at least one of the open connections includes the terminal issuing a request for closure of the at least one of the open connections, where the request refers to the at least one of the open connections by an identifier.

4. The method of claim 1, further including presenting the second content of the multimedia scene, wherein presenting the second content of the multimedia scene includes presenting the second content and a second plurality of fields within the multimedia scene.

5. The method of claim 1, wherein the selected field includes a graphical object of the multimedia scene.

6. The method of claim 1, wherein the attribute identifies the third value, and further including receiving the second content at the terminal through the new connection opened utilizing the new channel based on the identified attribute, wherein the first content and the second content are rendered in parallel such that rendering of the first content is maintained but a volume of the first content is reduced for allowing a user of the terminal to listen to audio of the second content.

7. The method of claim 1, wherein the receipt of the first content is interrupted a preset amount of time after a request for interruption is issued from the terminal.

8. The method of claim 1, wherein the selected field includes a hyperlink to the selected content, and the identified attribute of the selected field identifies one of the named channel, the current channel, and the new channel for receiving the second content hyperlinked to by the selected field.

9. A radio communication terminal, comprising:
    a processor for:
    receiving a multimedia scene including first content at a terminal over a current channel;
    presenting the multimedia scene at the terminal over the current channel, wherein presenting the multimedia scene includes presenting the first content and a plurality of fields within the multimedia scene;
    during the presentation of the multimedia scene, receiving a selection of one of the plurality of fields within the multimedia scene, wherein the selected field is associated with a second content;

in response to the selection of the field, identifying an attribute of the field, wherein the identified attribute identifies a channel for receiving the second content associated with the selected field;

managing the channel for receiving the second content associated with the selected field utilizing the identified attribute by:

identifying whether the attribute of the field identifies one of a first value, a second value, and a third value, when the attribute identifies the first value, determining that the second content will utilize a named channel, when the attribute identifies the second value, determining that the second content will utilize the current channel, and when the attribute identifies the third value, determining that the second content will utilize a new channel;

in response to a determination that the second content will utilize the named channel:

identifying an open connection already utilizing the named channel, closing the open connection that is already utilizing the named channel, and opening a new connection utilizing the named channel for receiving the second content utilizing the named channel, such that when the named channel is also the current channel utilized for receiving the first content, then the receipt of the first content is stopped;

in response to a determination that the second content will utilize the current channel:

closing an open connection that is already utilizing the current channel to receive the first content, opening a new connection utilizing the current channel for receiving the second content utilizing the current channel, and rendering progressively the second content in replacement of the first content; and in response to a determination that the second content will utilize the new channel, opening a new connection utilizing the new channel for receiving the second content of the multimedia scene utilizing the new channel while continuing to receive the first content at the terminal over the current channel.

10. A computer program product embodied on a non-transitory computer readable medium, comprising:

computer code for receiving a multimedia scene including first content at a terminal over a current channel;

computer code for presenting the multimedia scene at the terminal, wherein presenting the multimedia scene includes presenting the first content and a plurality of fields within the multimedia scene;

computer code for, during the presentation of the multimedia scene, receiving a selection of one of the plurality of fields within the multimedia scene, wherein the selected field is associated with a second content;

computer code for, in response to the selection of the field, identifying an attribute of the field, wherein the identified attribute identifies a channel for receiving the second content associated with the selected field;

computer code for managing the channel for receiving the second content associated with the selected field utilizing the identified attribute by:

identifying whether the attribute of the field identifies one of a first value, a second value, and a third value, when the attribute identifies the first value, determining that the second content will utilize a named channel, when the attribute identifies the second value, determining that the second content will utilize the current channel, and when the attribute identifies the third value, determining that the second content will utilize a new channel;

computer code for, in response to a determination that the second content will utilize the named channel:

identifying an open connection already utilizing the named channel, closing the open connection that is already utilizing the named channel, and opening a new connection utilizing the named channel for receiving the second content utilizing the named channel, such that when the named channel is also the current channel utilized for receiving the first content, then the receipt of the first content is stopped;

computer code for, in response to a determination that the second content will utilize the current channel:

closing an open connection that is already utilizing the current channel to receive the first content, opening a new connection utilizing the current channel for receiving the second content utilizing the current channel, and rendering progressively the second content in replacement of the first content; and computer code for, in response to a determination that the second content will utilize the new channel, opening a new connection utilizing the new channel for receiving the second content of the multimedia scene utilizing the new channel while continuing to receive the first content at the terminal over the current channel.

* * * * *